United States Patent [19]

Moldenhauer

[11] 3,720,289

[45] March 13, 1973

[54] MOTORCYCLE CHAIN OILER

[76] Inventor: Charles L. Moldenhauer, 6A Saratoga Lane North, Plymouth, Minn. 55427

[22] Filed: June 1, 1971

[21] Appl. No.: 148,461

[52] U.S. Cl. .................................. 184/15 A, 184/28
[51] Int. Cl. .............................................. F16n 13/08
[58] Field of Search ...... 184/14, 15 R, 15 A, 28, 6.28

[56] References Cited

UNITED STATES PATENTS

| | | | |
|---|---|---|---|
| 2,944,538 | 7/1960 | Conway et al. | 184/28 X |
| 508,485 | 11/1893 | Mowrer et al. | 184/15 R |
| 1,689,613 | 10/1928 | Zerk | 184/28 |
| 1,958,557 | 5/1934 | Zerk | 184/28 |
| 3,012,632 | 12/1961 | Bradley | 184/15 R |

FOREIGN PATENTS OR APPLICATIONS 127,915  9/1928  Switzerland ...................... 184/15 R Primary Examiner—Manuel A. Antonakas
Attorney—Carlsen, Carlsen & Sturm

[57] ABSTRACT

A chain oiler for motorcycles having a reservoir and pump independent of the motorcycle engine adapted to be mounted on the cycle frame in a position conveniently accessible to the rider. A jet nozzle also adapted to be mounted on the frame and directed at the point of meeting of the lower run of the rear cycle chain and rear sprocket and a flexible line connecting the pump to the jet nozzle.

4 Claims, 4 Drawing Figures

PATENTED MAR 13 1973
3,720,289
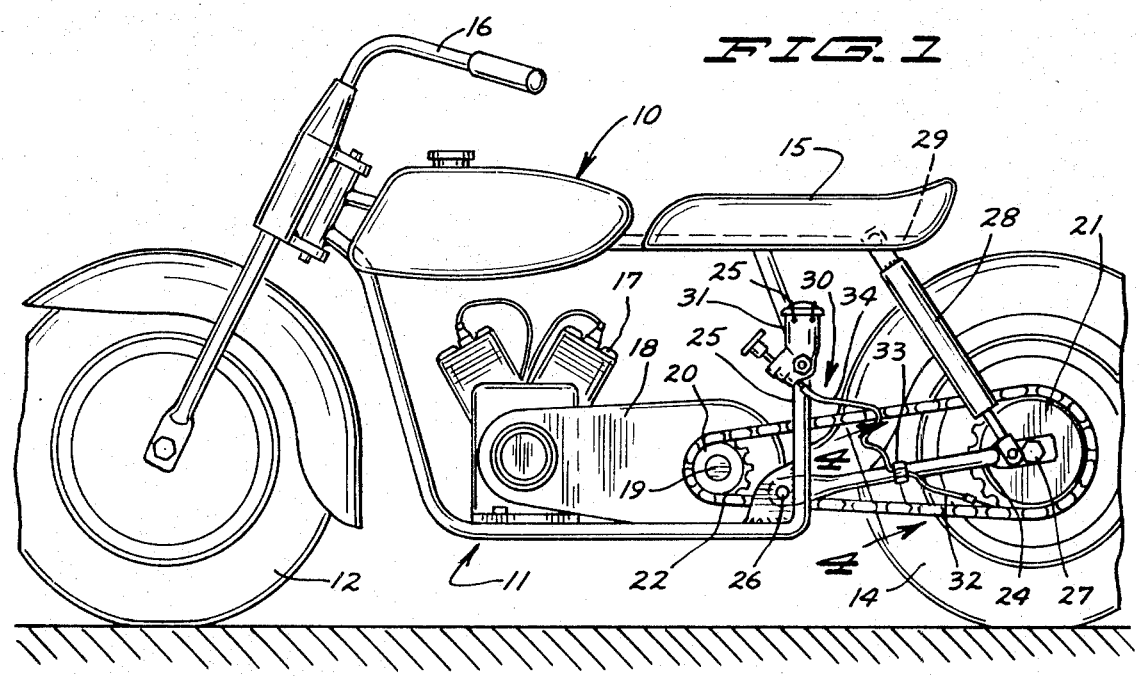
FIG.1
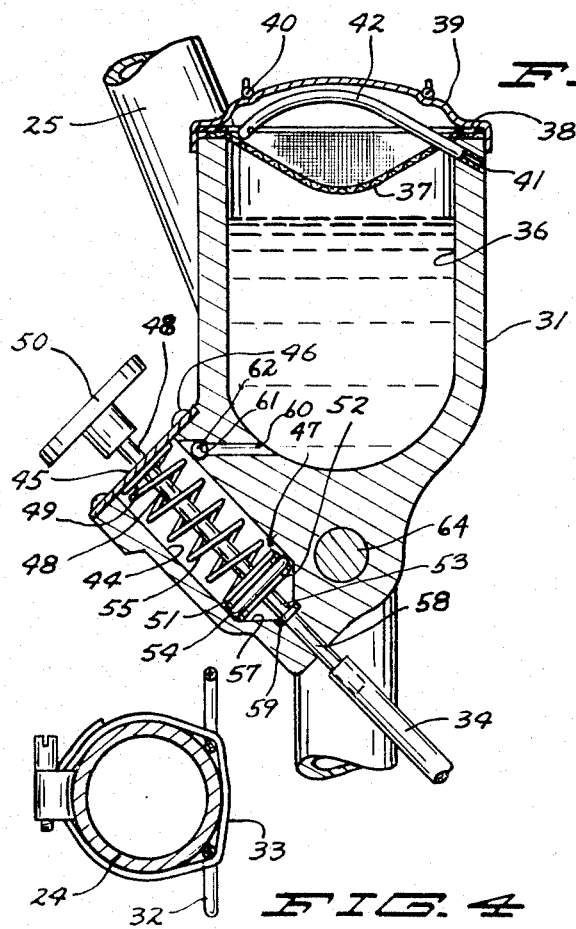
FIG.2
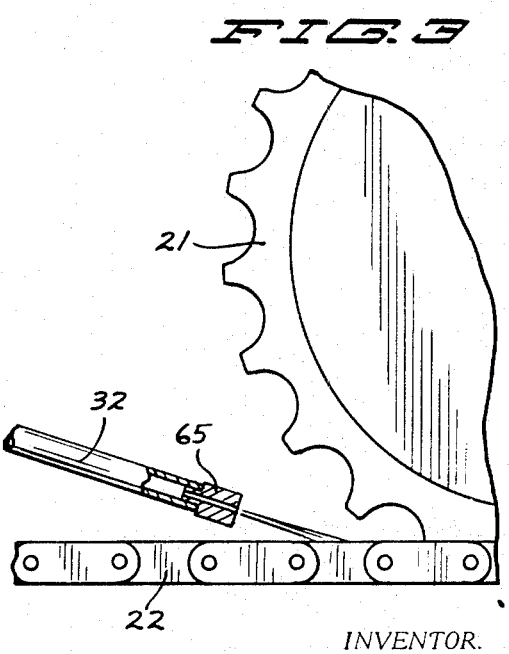
FIG.3
FIG.4
INVENTOR.
CHARLES L. MOLDENHAUER
BY
Carlsen, Carlsen & Sturm
ATTORNEYS

MOTORCYCLE CHAIN OILER

BACKGROUND OF THE INVENTION

This invention relates to motorcycle chain oilers which are mounted on the cycle and allow the operator to selectively apply a limited quantity of lubricant oil to the chain while the vehicle is in operation.

In modern motorcycle construction two chain drives are utilized with a front chain transmitting power from the engine to the clutch shaft and a rear chain transmitting power from the clutch shaft to the rear wheel of the vehicle. The front chain is generally enclosed in a housing and is lubricated by an oil bath.

Also, generally, the rear chain is lubricated by oil pumped from the engine oil reservoir or thrown off by the front chain against a shelf at the rear of the front chain guard which then drains out through a small tube onto the rear chain. An example of the latter construction is found in U.S. Pat. No. 3,012,632.

Both of these systems of rear chain lubrication, being in constant yet uncontrolled and unconfined operation, are dirty and wasteful. Moreover, it is found that engine oil is not the most satisfactory lubricant for the drive chain where penetration and adherence are important qualities.

SUMMARY OF THE INVENTION

The primary object of the present invention is to provide a chain oiler for the rear chain of a motorcycle which allows the operator to positively apply a given amount of lubricant to the rear chain while he is operating the vehicle whenever he feels as though it is necessary.

Another object of the invention is to provide a chain oiling device which can be readily and permanently mounted on any type of motorcycle in such a position where it may be conveniently actuated by the cycle driver while operating the vehicle.

Still another object of the invention is to provide a rear chain oiling attachment for motorcycles which deposits oil on the chain in the most efficient manner.

With these and other objects in mind the invention broadly comprises a combination oil reservoir and plunger-type pump for mounting on the motorcycle frame in a position accessible to a rider, a jet nozzle for mounting on the frame in a position to direct a spray of oil at the juncture between the lower run of the rear chain and the rear sprocket, and a conduit connecting the pump to the nozzle.

BRIEF DESCRIPTION OF THE DRAWINGS

In the drawings:

FIG. 1 is a left side elevation of a motorcycle with the chain oiler mounted thereon.

FIG. 2 is a vertical section taken through the oiler reservoir and pump.

FIG. 3 is an enlarged fragmentary elevation showing the position of the jet nozzle relative to the motorcycle drive chain and with the nozzle shown in section.

FIG. 4 is a section taken on line 4—4 of FIG. 1.

DESCRIPTION OF THE PREFERRED EMBODIMENT

Referring now more particularly to the drawing, reference numerals will be used to denote like parts or structural features in the different views. The numeral 10 denotes generally a conventional motorcycle having a frame 11 supported on a front wheel 12 and a rear wheel 14. The frame 11 supports an operator's seat 15, handlebars 16 for steering front wheel 12, and a motive engine 17. A front chain housing 18 encloses a chain which transmits power from engine 17 to a clutch shaft 19 on which there is mounted a sprocket 20. Sprocket 20 has a driving connection with sprocket 21 through endless chain 22. Sprocket 21 is mounted coaxial with and drives rear wheel 14.

Frame 11 includes an auxiliary frame section having bars 24 pivoted to an upright frame member 25 as at 26 and extending rearwardly on each side of wheel 21 and connected at their rear ends to axle 27 of the rear wheel. A pair of rear shock absorber springs 28 extend downwardly from a frame member 29 to bars 24 at each side of rear wheel 14. Accordingly rear wheel 14 is permitted limited vertical movement relative to the main portion of frame 11.

The chain oiler forming the subject of the present invention is denoted generally by the numeral 30. It comprises a reservoir-pump unit denoted generally at 31 mounted on frame member 25, a jet nozzle 32 mounted on one of the bars 24 by bracket 33, and a tube 34 of flexible material connecting unit 31 to nozzle 32.

The reservoir-pump unit 31 is a metal casting and has an open topped oil chamber or reservoir 36 formed in the upper portion thereof. A screen filter 37 covers the upper end of chamber 36 and is held in place by a gasket 38 and a cover 39 which is locked onto the unit 31 by a hinged spring clip 40. An aperture 41 is provided in the side wall of the reservoir and a small air tube 42 has one end disposed above filter 37 and the other end inserted into aperture 41 to admit air to the upper portion of chamber 36.

A cylindrical pump chamber 44 is formed in the lower portion of the unit 31 and has its upper open end covered by a plate 45 held on by screws 46. A plunger 47 is disposed within chamber 44. This plunger has a stem 48 extending axially through the chamber 44 and slidably through plate 45 and a seal 49 on the inner side of the plate. A handle 50 is mounted on the end of stem 48 outside of chamber 44 and a split piston is mounted on the stem adjacent to the opposite end. This piston comprises a pair of discs 51 and 52 with an O-ring 54 sandwiched therebetween and in frictional sealing engagement with the chamber wall. A spiral spring 55 encircles stem 48 between the seal 49 and disc 51. Disc 51 is imperforate and fixed on stem 48 or otherwise sealed thereto. Disc 52 is also fixed on the shaft 48 but is provided with minute apertures (not shown) which allow lubricant passage therethrough. Ring 54 is permitted limited axial movement between discs 51 and 52.

The lower end of chamber 44 tapers as at 57 to a seat at one end of a fitting 58 extending out the lower end of the unit 31 and providing open communication between chamber 44 and flexible tube 34. A sealing ring 59 is provided in the seat at the lower end of chamber 44 so that when the lower end portion 53 of stem 48 is at rest thereagainst, the bottom of the chamber is closed against fluid passage.

Unit 31 is provided with a passageway 60 connecting the bottom portion of chamber 36 with the upper portion of chamber 44. A seat 61 in the passageway seats a ball valve 62 to permit lubricant passage from chamber 36 to chamber 44, but not in a reverse direction. Unit 31 is secured to frame bar 25 by a suitable bracket and bolt means 64.

Jet nozzle 32 comprises an S-shaped piece of rigid tubing with the upper bight portion thereof secured to the left bar 24 by the band or bracket 33 (FIG. 4) and with the upper end connected to the lower end of flexible tube 34. The lower end of nozzle 32 has a spray head 65 mounted thereon spaced just above the lower run of chain 22 with the aperture in the head directed at the chain just forward of the meeting between the chain and sprocket 21.

Operation of the oiling device will now be explained. With the filter 37 in place and cover 39 removed the chamber 36 is filled with a suitable liquid chain lubricant and the cover is then replaced and locked in position by clip 40. A portion of the lubricant will drain through passageway 60 into pump chamber 44 but will be held above the ring 59 due to the seal created between shaft portion 53 and ring 59 under the force of spring 55. When it is desired to oil chain 22 while the motorcycle is in operation, the operator merely pulls the plunger handle upwardly and releases it. During the upward movement the seal between disc 51 and ring 54 will be broken and the lubricant being trapped in chamber 44 by ball valve 62 will flow around disc 51 and through the apertures in disc 52 into the area below the piston. Then as the handle 50 is released components 51 and 54 of the piston will reseal and the lubricant will be forced through fitting 58, flexible line 34, jet nozzle 32 and head 65 in a jet stream onto the chain 22. The orifice in head 65 is sufficiently small so that the chain 22 will go through one or more complete revolutions even at a low speed before one charge from chamber 44 is completely ejected. During downward movement of the piston a new charge of lubricant will be drawn into chamber 44 through passageway 60. When the piston formed by discs 51 and 52 and ring 54 has completely descended under force of spring 55, the end portion 53 of stem 48 will seat against O-ring 59 forming a second seal against leakage from chamber 44. Air tube 42 admits atmosphere pressure to the top of chamber 36 to facilitate drainage therefrom and filter 37 serves as an air filter.

While the oiler may be used to dispense oil upon the chain along any portion of its run, the positioning of nozzle 32 to squirt oil in an angular jet spray onto the rearwardly moving portion of the chain as it meets the rear sprocket is believed to be significant. The angularity assures maximum chain coverage by minimizing the passage of lubricant directly through openings in the chain. Also the meshing of the chain with the sprocket immediately after the oil has been applied aids in distributing the lubricant over the chain rollers and pins before it can drain off of the chain and, of course, application to the inner side of the chain limits lubricant loss caused by centrifugal discharge from the chain.

The flexible tube 34 allows relative movement of the rear wheel about pivot axis 26 without damaging the oiler.

Having now therefore fully illustrated and described my invention, what I claim to be new and desire to protect by United States Letters Patent is:

1. A device for oiling the drive wheel chain of a motorcycle having a frame supported on front and rear wheels, a power source on the frame, and an endless drive chain transmitting power from the power source to a sprocket mounted concentrically with the rear wheel which comprises
   a. an oil reservoir independent of the power source mounted on the frame,
   b. a jet nozzle mounted on the frame and having a restricted outlet orifice spaced above and directed at a portion of the drive chain,
   c. a lubricant conduit connecting the reservoir to the jet nozzle, and
   d. a pumping means in the conduit for forcing a limited amount of lubricant from the reservoir to the nozzle to be deposited on the chain,
   e. said pumping means including a piston biased by spring tension against lubricant in the conduit to force the lubricant through the orifice in a continuous stream.

2. The subject matter of claim 1 wherein said outlet orifice is directed at the junction between the lower run of the chain and the sprocket.

3. The subject matter of claim 1 wherein a portion of said lubricant conduit is formed by a section of flexible tubing whereby the reservoir and jet nozzle may be independently mounted on relatively movable portions of the frame.

4. The subject matter of claim 1 wherein said piston is slidably disposed within a chamber mounted on the reservoir with an actuator handle extending upwardly therefrom through the top of the chamber so as to be conveniently accessible to an operator of the motorcycle while in driving position, and a spiral spring disposed between the piston and top of the chamber to exert said spring tension on the piston.

* * * * *